United States Patent [19]

Douglas

[11] Patent Number: 5,203,419

[45] Date of Patent: Apr. 20, 1993

[54] POSTAL SCALE HAVING EXTENDABLE WEIGHT DISPLAY FOR WEIGHING OVERSIZE PACKAGES

[75] Inventor: Alec Douglas, St. Johnsbury, Vt.

[73] Assignee: Fairbanks, Inc., Kansas City, Kans.

[21] Appl. No.: 788,091

[22] Filed: Nov. 5, 1991

[51] Int. Cl.$^5$ ........................................... G01G 21/28
[52] U.S. Cl. .................................... 177/244; 177/264
[58] Field of Search .................... 177/244, 264, 144

[56] References Cited

U.S. PATENT DOCUMENTS

| | | | |
|---|---|---|---|
| 2,805,055 | 9/1957 | Swanson | 177/211 |
| 3,106,975 | 10/1963 | Madigan | 177/126 |
| 3,469,645 | 9/1969 | Provi et al. | 177/210 R |
| 3,838,744 | 10/1974 | Tanji et al. | 177/177 |
| 4,273,205 | 6/1981 | De Voogd | 177/210 FP |
| 4,518,052 | 5/1985 | Chen | 177/245 |
| 4,537,266 | 8/1985 | Greenberg | 177/208 |
| 4,582,151 | 4/1986 | Mairot et al. | 177/144 |
| 4,632,199 | 12/1986 | Ober et al. | 177/238 |
| 4,979,579 | 12/1990 | Dardat et al. | 177/180 |

*Primary Examiner*—Benjamin R. Fuller
*Assistant Examiner*—Randy W. Gibson
*Attorney, Agent, or Firm*—Bryan Cave

[57] ABSTRACT

A postal type scale (20), such as an electronic scale, capable of weighing a plurality of different size packages (24, 34) comprises a weighing mechanism (26), a platform (22) for supporting a package (24, 34) thereon in a weighing relationship, and a movable weight display (30, 36) slidably mounted to the platform (22) and longitudinally extendable therefrom along a horizontal mounting surface (38) when the platform (22) is supported on the horizontal mounting surface (38). The weight display (30, 36) comprises a horizontal weight display (30, 30b), such as an LCD display (30b), which may be removably mounted to the horizontally movable display mounting member (36) for providing the display (30) at a position remote from the mounting member (36). The weight display (30, 36) is variably extendable beyond the platform edge (32) along the horizontal mounting surface (38) from a display rest position to a plurality of different longitudinal positions beyond the platform edge (32) within a predetermined longitudinal range for enabling the weight display (30, 30b) to be longitudinally moved along the horizontal mounting surface (38) to a variable position for enabling the display (30, 30b) to be readable from above the supported package (24, 34) irrespective of the size of the package (24, 34) within that range.

28 Claims, 7 Drawing Sheets

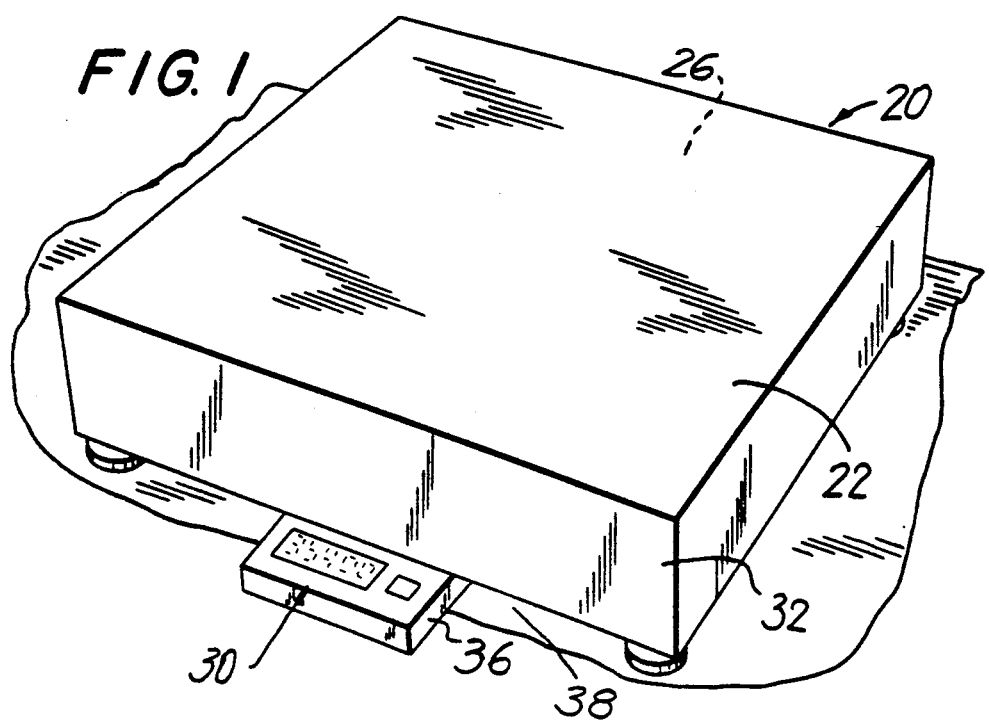
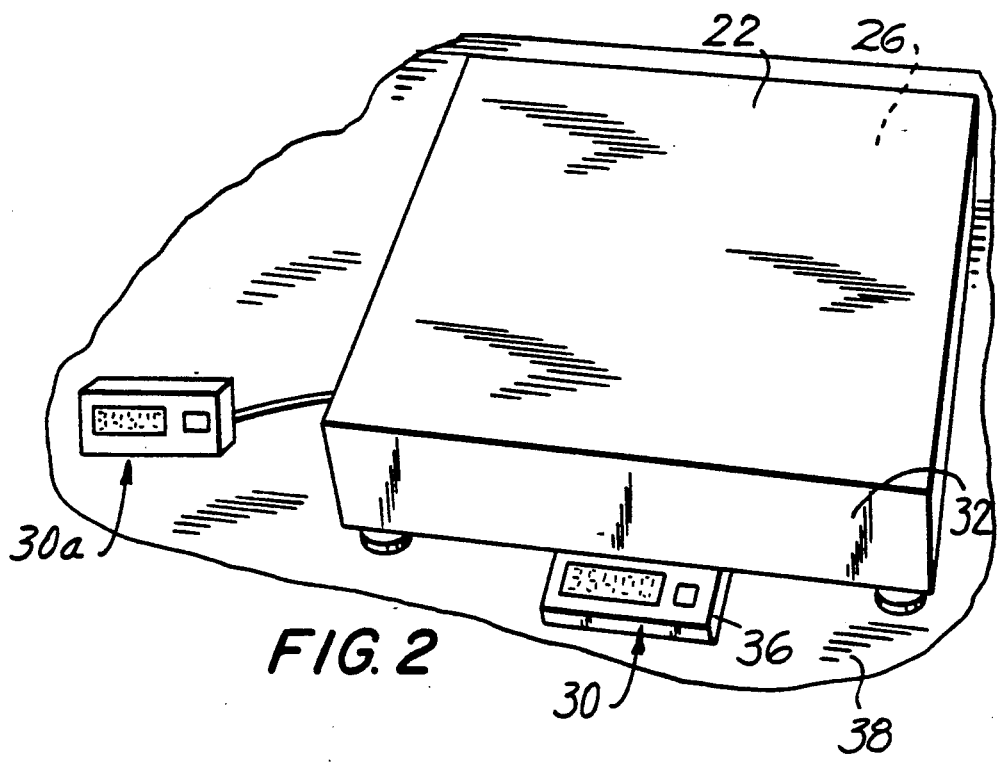

POSTAL SCALE HAVING EXTENDABLE WEIGHT DISPLAY FOR WEIGHING OVERSIZE PACKAGES

TECHNICAL FIELD

The present invention relates to weighing scales, and more particularly to universal postal type scales capable of weighing a plurality of different size packages in which a horizontal display may be readable from above irrespective of the package size.

BACKGROUND ART

Postal scales are well known in the art as are portable weighing scales which can be moved from place to place or left on a counter or other surface at a particular location and which have remotely positioned displays separate from the weighing platform, such as disclosed in U.S. Pat. Nos. 2,805,055; 3,106,975; 3,469,645; 4,273,205; 4,537,266; 4,632,199; and 4,979,579. In this regard, U.S. Pat. No. 3,106,975 discloses such a portable scale which opens in size to accommodate large size packages such as suitcases and luggage, in which the weight display is pneumatically coupled to the scale on the side so as to assist in visibility of the display from above when a large size package is positioned on the scale; however, the display location is fixed and thus, limits visibility if the package has a dimension larger in size than the fixed position of the side located display. Moreover, since the display location is fixed in a fully extended position, the scale cannot be made more compact for smaller packages which can create problems when space is at a premium, such as in an office mailroom environment. Similarly, U.S. Pat. No. 4,537,266 discloses a portable scale in which the longitudinal extent of the horizontal display is also fixed resulting in the same problems as discussed above.

U.S. Pat. No. 4,979,579 discloses a portable weighing device, namely an electronic balance, in which the horizontal display pivots about the weighing area and telescopes merely to adapt to the contour of the weighing area. However, the display is not longitudinally extendable so as to be able to be viewed from above irrespective of the size of the package placed on the scale. This is not surprising since the disclosed balance contains a fixed size chamber which is intended to accommodate the material to be weighed inside this chamber rather than to weigh removable packages of variable size or dimension, such as what is normally done in using a postal type scale.

With respect to U.S. Pat. Nos. 2,805,055; 3,469,645; 4,273,205; and 4,632,199, although all of the disclosed weighing devices have separate remote displays, these displays are not also longitudinally extendable from the scale so as to be visible from above while also retracting to a compact position within the scale base so as to minimize the space for the scale and the display both of which are particularly desirable in office mail room environments, for example, where the amount of the space allocated for a postal type scale is often severely limited.

Thus, none of the prior art portable scales known to applicant is capable of providing a compact postal type scale capable of weighing a plurality of different size or dimension packages in which a horizontal weight display is longitudinally extendable from the scale base along the supporting surface so as to be visible from above no matter what the size of the package placed on the scale throughout a given size range, while also being retractable to a compact rest position in the scale base for normal size packages. These disadvantages of the prior art are overcome by the present invention.

DISCLOSURE OF THE INVENTION

A postal type scale, such as an electronic scale, capable of weighing a plurality of different size packages comprises a weighing mechanism, a platform for supporting a package thereon in a weighing relationship, and a movable weight display means slidably mounted to the platform and longitudinally extendable therefrom along a horizontal mounting surface when the platform is supported on the horizontal mounting surface. The weight display means comprises a horizontal weight display, such as an LCD display, which may be removably mounted to the horizontally movable display mounting member for providing the display at a position remote from the mounting member. The weight display means is variably extendable beyond the platform edge along the horizontal mounting surface from a display rest position to a plurality of different longitudinal positions beyond the platform edge within a predetermined longitudinal range for enabling the weight display to be longitudinally moved along the horizontal mounting surface to a variable position for enabling the display to be readable from above the supported package irrespective of the size of the package within that range.

BRIEF DESCRIPTION OF THE DRAWINGS

FIG. 1 is a perspective view of a preferred embodiment of the postal type scale of the present invention with the horizontally readable display in the rest position;

FIG. 2 is a perspective view, similar to FIG. 1, of the embodiment of the scale of FIG. 1 with an optional second display;

BEST MODE FOR CARRYING OUT THE INVENTION

Figure 3:
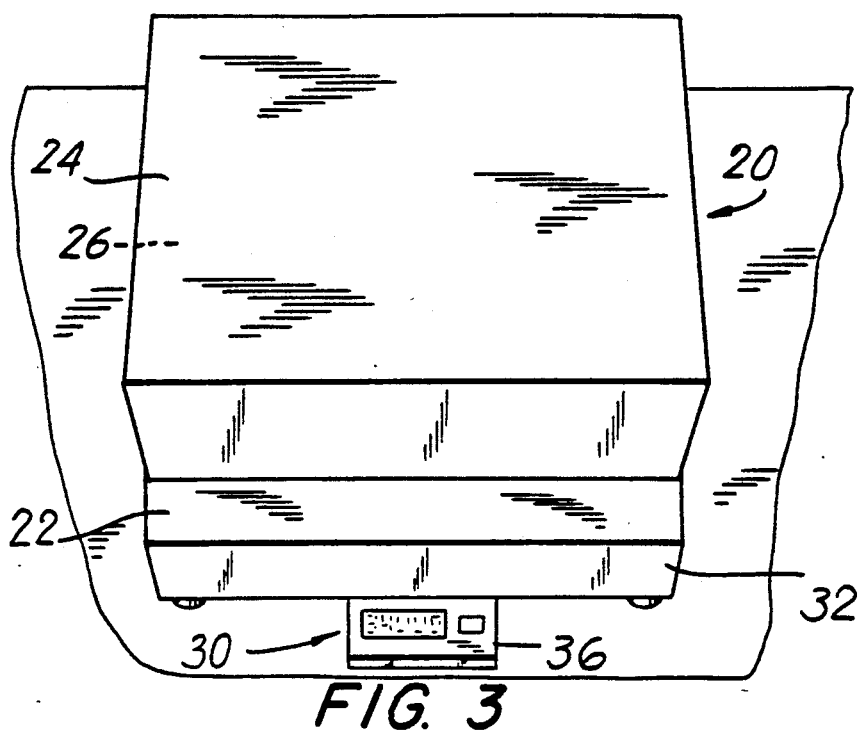
FIG. 3 is a perspective view, partially in plan, of the embodiment of FIG. 1, with a normal size package being weighed.

Referring now to the drawings in detail, and initially to FIGS. 1–6, the presently preferred postal type scale of the present invention, generally referred to by the reference numeral 20, shall be described. As shown and preferred, the scale 20 includes a weighing platform 22 for supporting a package 24 thereon in a weighing relationship with a conventional load cell weighing mechanism 26 conventionally located under the weighing platform 22. As shown and preferred in FIGS. 7-8, the load cell is a conventional digital load cell 26, which, together with the conventional logic circuitry 28 illustrated in FIGS. 7A-8 conventionally provides a digital readout of the weight of the package 24 on the conventional LCD display 30 which may conventionally display the weight in kilograms or pounds. The weighing platform 22 has a predetermined size defined by an edge 32 surrounding the periphery of the platform 22 and is capable of supporting different size packages thereon, such as the oversized package 34, which is larger than the platform 22 and extends beyond the edge 32, as well as normal size packages 24, in weighing relationship so as to provide a digital readout on the display 30 of the weight of the package 24 or 34 being supported on the platform 22.

Figure 4:
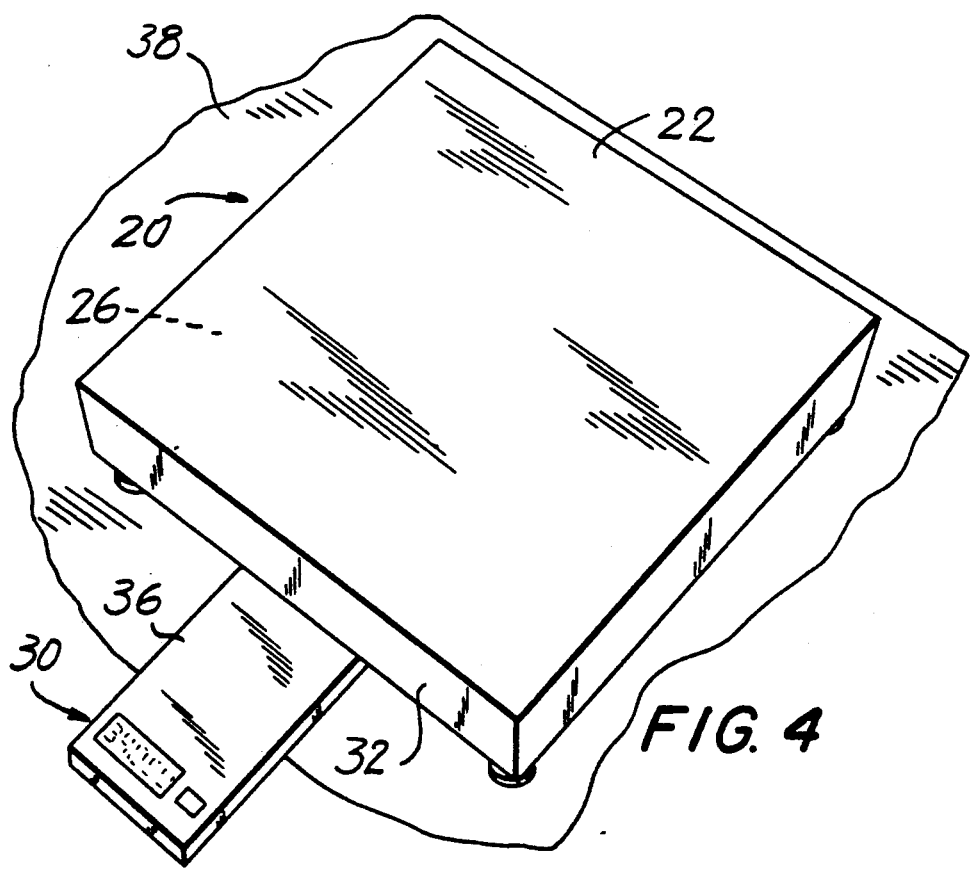
FIG. 4 is a perspective view of the scale of FIG. 1 with the horizontally readable display fully extended longitudinally along the supporting surface.
Figure 5:
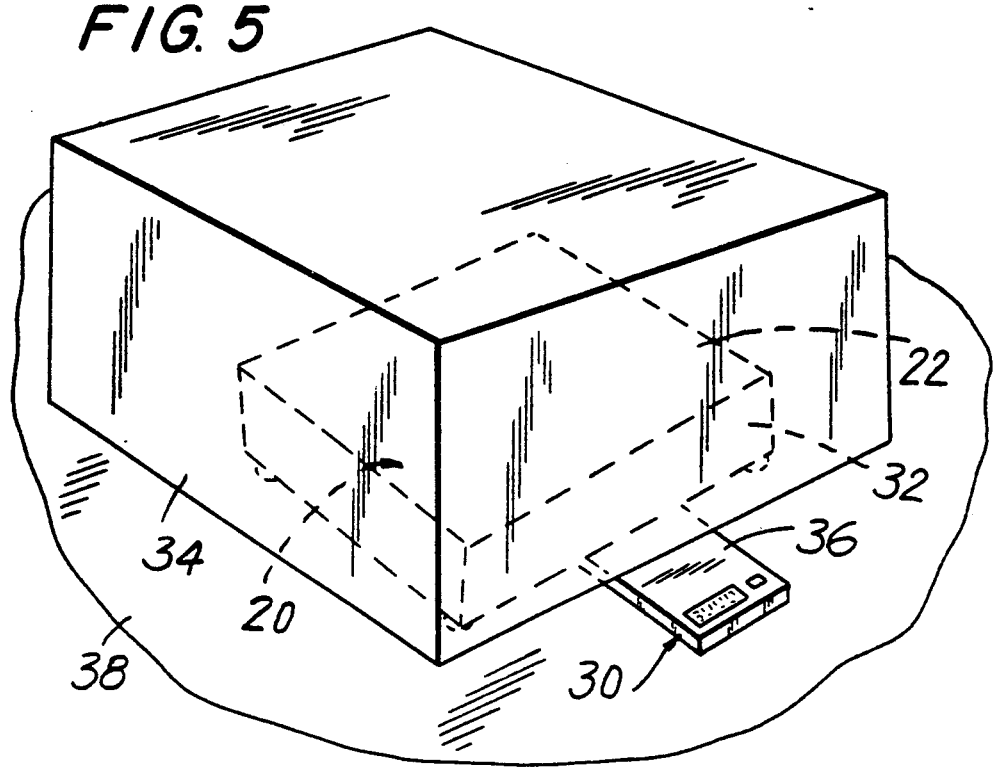
FIG. 5 is a diagrammatic view of the scale of FIG. 4 with an oversized package being placed into a weighing position on the scale and the display fully extended.
Figure 6:
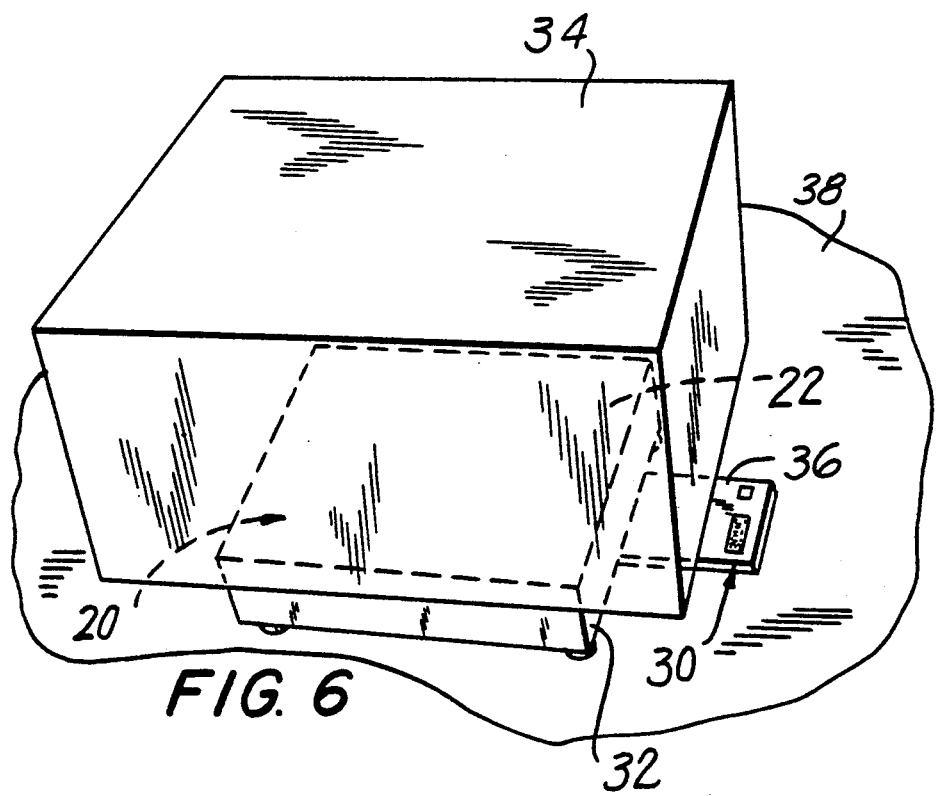
FIG. 6 is a diagrammatic view, similar to FIG. 5, with the oversized package in weighing position on the scale and the display fully extended.
Figure 7A:
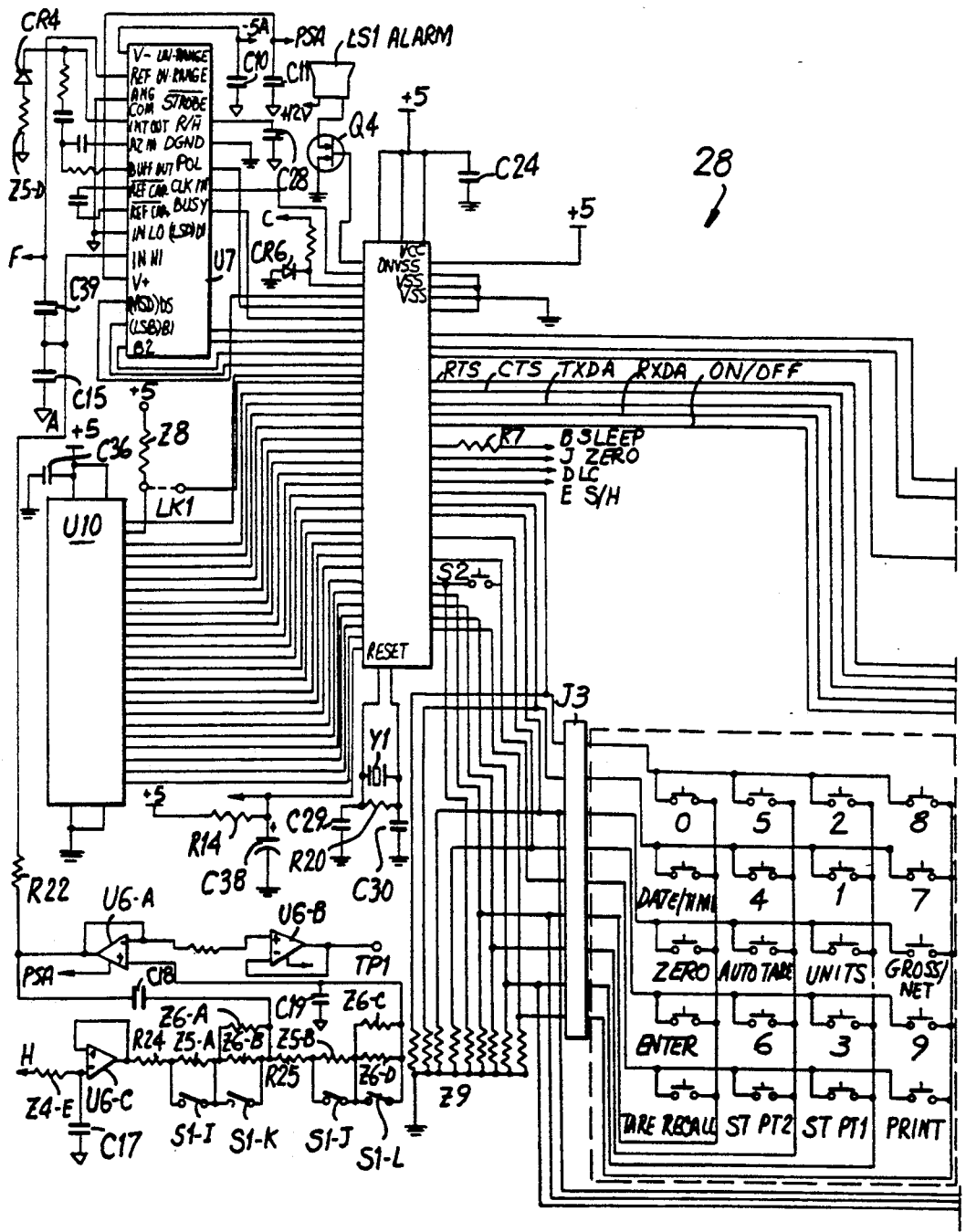
FIGS. 7A, 7B and 8 taken together comprise a logic schematic diagram of the electronics of the preferred electronic scale of FIG. 1.
Figure 7B:
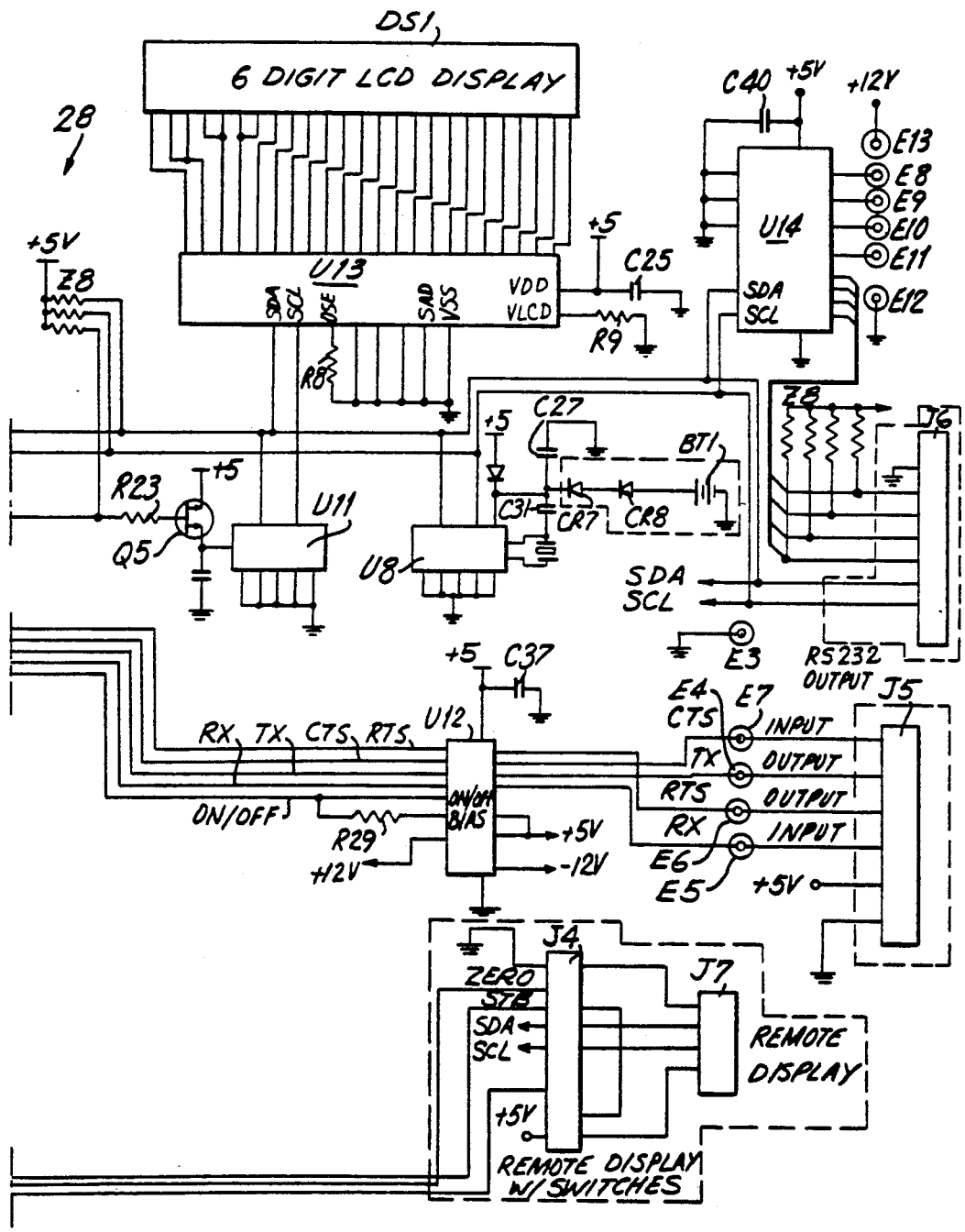
Figure 8:
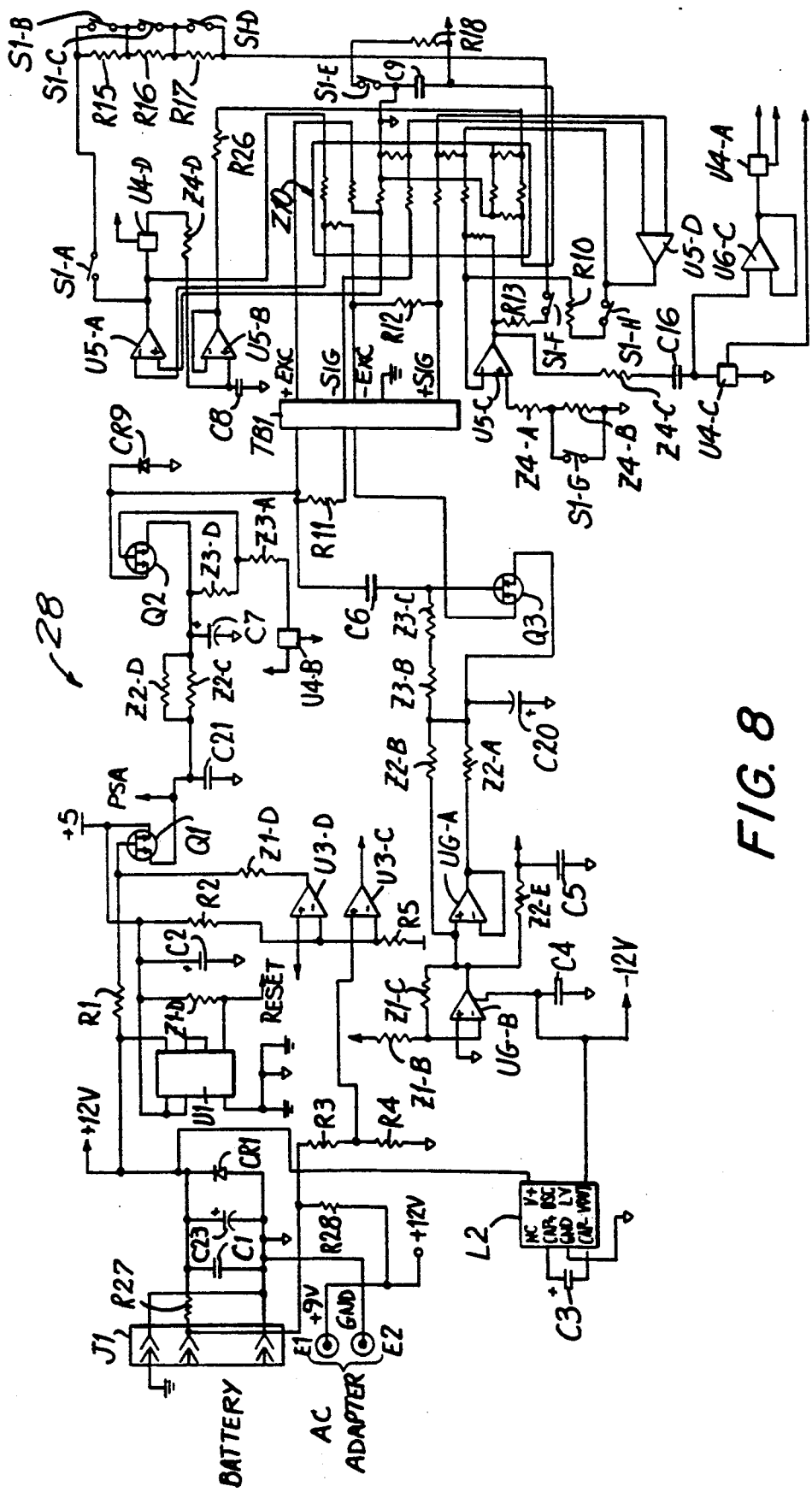

As shown and preferred, the LCD display 30 is a horizontally readable display comprised of a plurality of horizontal LCD indicators, with the display 30 preferably being mounted or contained in a slide drawer 36 which is longitudinally extendable from the base of the weighing platform 22 along the horizontal supporting surface 38 which supports the scale 20, such as a countertop in a mailroom, from the display rest position shown in FIGS. 1-3 to the fully extended position shown in FIGS. 4-6. In the display rest position, the display 30 preferably longitudinally extends from the platform edge 32 by only substantially the horizontal height of the LCD display indicia. The slidable mounting of slide drawer 36 is a conventional mechanical mount and need not be shown. The electronic connection of the display 30 to the logic circuitry 28 and the load cell 26 is illustrated in FIGS. 7A-8 and need not be described in greater detail. As shown and preferred in FIGS. 4-6, the slide drawer 36 and the horizontal LCD display 30 is shown in the fully extended position to accommodate the maximum size oversized package 34 on the platform 22 while still enabling the display 30 to be readable from above the package 34, as shown in FIG. 6, even though the edge of the oversized package extends beyond the edge 32 of the platform 22. The slide drawer 36 and horizontal LCD display 30 may also preferably be longitudinally extended to any intermediate position between the extremes of the range illustrated by FIGS. 1 and 4. By way of example, for a normal type postal scale 20, the platform 20 may be 14 inches by 14 inches and, with the display 30 protruding 1.5 inches from the platform edge 32 in the display rest position illustrated in FIGS. 1-3, can easily accommodate oversized packages 34 as large as 30 inches by 30 inches on the 14 inch by 14 inch platform 22 in the above example, with the display 30 fully extended as in FIGS. 4-6. It should be noted that in viewing the LCD display 30 from above when oversized packages 3 are on the platform 22, the extended display 30 may be viewed directly from above or from above by diagonally looking down on the display 30 if the package 34 edge is beyond the longitudinal extent of the extended display 30.

As shown and preferred in FIGS. 7A-8, the electronic scale 20 may have a conventional RS232 output for conventional telecommunication to a computer (not shown) if desired. In addition, the electronic scale 20 may operate on AC power or on a rechargeable battery or selectively on both, if desired. In addition, as shown and preferred in FIG. 2, an optional remote second display 30a may also be provided and electronically interconnected to the logic circuitry 28 as shown in FIGS. 7A-8.

Figure 9:
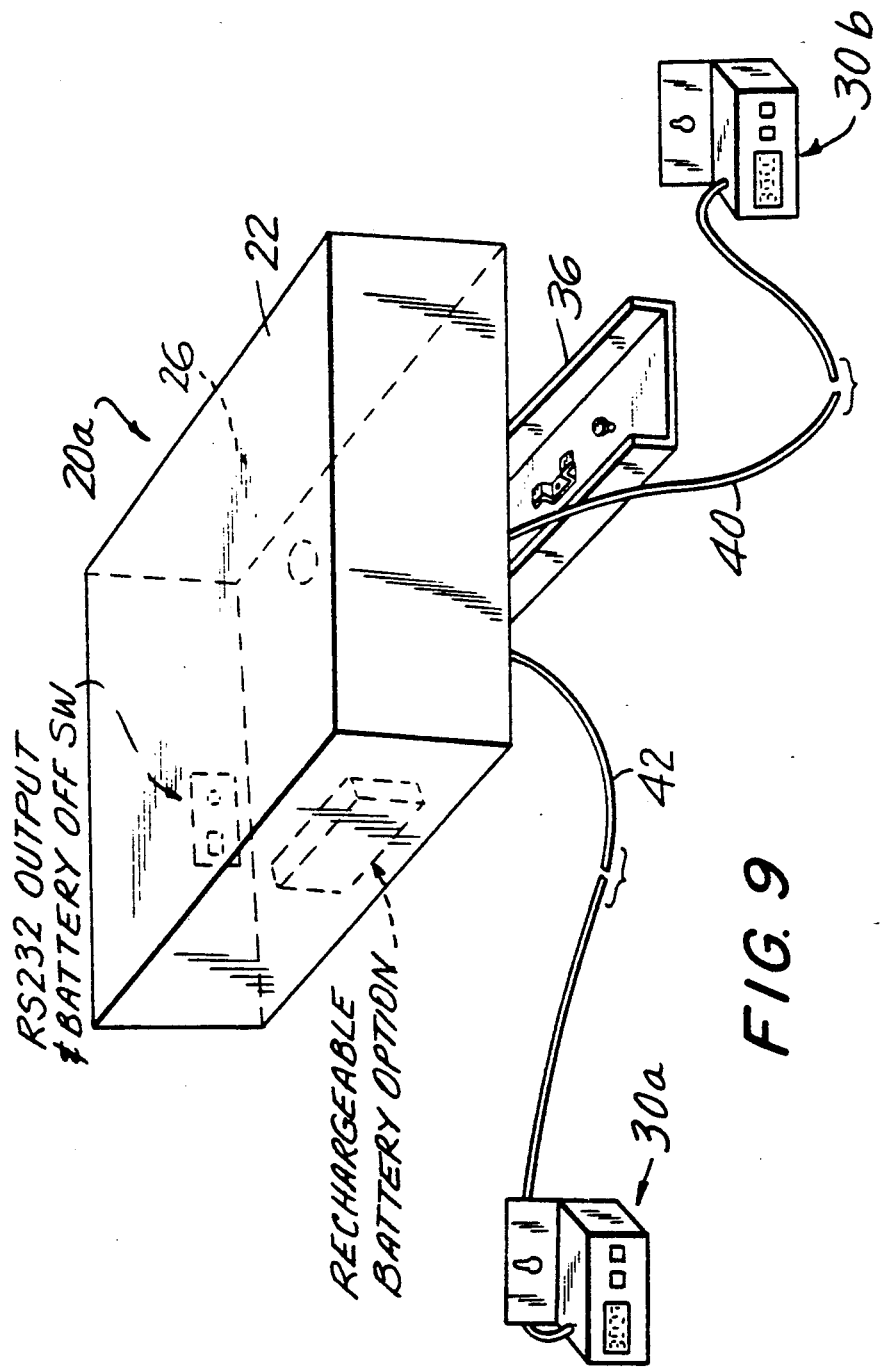
FIG. 9 is a diagrammatic view, partially in perspective, of an alternative embodiment of the scale of FIG. 1 in which the horizontal display is removably mountable in a slide drawer and an optional second display is provided.

Referring now to FIG. 9, an alternative embodiment 20a of the scale 20 of FIG. 1 is shown. The primary difference between the scale 20 of FIG. 1 and the scale 20a of FIG. 9 is that the LCD display 30a is removably mountable in slide drawer so that it may be used horizontally in the manner previously described with reference to the embodiment 20 of FIG. 1, or may be removed from the slide drawer 36 and placed at a remote location, or hung up, at a remote distance from the platform 22 determined by the length of the cable 40 which connects the LCD display 30b to the logic circuitry 28. An optional second remote display 30a, such as the type of display shown in FIG. 2, may also be provided and connected to the logic circuitry 28 by a second cable 42. Apart from these distinctions, the embodiment of FIG. 9 is preferably the same as the embodiment of FIGS. 1-8 and need not be described in greater detail hereinafter.

Thus, by utilizing the electronic postal type scale of the present invention, a compact scale may be provided in which the horizontal weight display may be readable from above the weighing platform irrespective of the size of the package supported thereon within a predetermined range of package sizes weighable on the scale.

What is claimed is:

1. A postal type scale capable of weighing a plurality of different size packages, said scale comprising a weighing mechanism; a platform for supporting a package thereon in a weighing relationship with said weighing mechanism when said platform is supported on a horizontal mounting surface, said platform having a periphery and a predetermined size defined by an edge surrounding said periphery of said platform and being capable of supporting said different size packages thereon in said weighing relationship, said platform being capable of supporting a package having a predetermined size greater than said predetermined size of said platform whereby said supported package has an edge which extends beyond said platform edge; and a movable weight display means for displaying a weight associated with said package supported on said platform in said weighing relationship, said weight display means being slidably mounted to said platform and longitudinally extendable therefrom along said horizontal mounting surface when said platform is supported on said horizontal mounting surface, said weight display means comprising a horizontal weight display and being variably extendable beyond said platform edge along said horizontal mounting surface from a display rest position to a plurality of different longitudinal positions beyond said platform edge within a predetermined longitudinal range for enabling said weight display to be longitudinally moved along said horizontal mounting surface to a variable position for enabling said horizontal weight display to a readable from above said supported package, said longitudinal range being dependent on a predetermined range of package sizes weighable on said platform scale; whereby said horizontal weight display may be readable from above said platform when the size of the package supported thereon is within said predetermined range of package sizes weighable on said scale.

2. A postal type scale in accordance with claim 1 wherein said scale is an electronic scale.

3. A postal type scale in accordance with claim 2 wherein said horizontal weight display comprises a digital readout.

4. A postal type scale in accordance with claim 3 wherein said digital readout comprises an LCD display.

5. A postal type scale in accordance with claim 4 wherein said LCD display comprises a plurality of horizontal LCD indicators.

6. A postal type scale in accordance with claim 4 wherein in said rest position of said weight display means said weight display longitudinally extends beyond said platform edge a predetermined amount for enabling said horizontal weight display to be readable from above when said supported package size does not exceed said platform size.

7. A postal type scale in accordance with claim 6 wherein said horizontal weight display comprises display indicia having a predetermined longitudinal extend, said predetermined amount of longitudinal extension for said weight display in said rest position substantially comprising said longitudinal extent of said display indicia.

8. A postal type scale in accordance with claim 7 wherein said predetermined amount of longitudinal extension comprises approximately 1.5 inches.

9. A postal type scale in accordance with claim 1 wherein in said rest position of said weight display means said weight display longitudinally extends beyond said platform edge a predetermined amount for enabling said horizontal weight display to be readable from above when said supported package size does not exceed said platform size.

10. A postal type scale in accordance with claim 9 wherein said horizontal weight display comprises display indicia having a predetermined longitudinal extent, said predetermined amount of longitudinal extension for said weight display in said rest position substantially comprising said longitudinal extent of said display indicia.

11. A postal type scale in accordance with claim 10 wherein said predetermined amount of longitudinal extension comprises approximately 1.5 inches.

12. A postal type scale in accordance with claim 1 wherein said horizontal weight display comprises a digital readout.

13. A postal type scale in accordance with claim 12 wherein said digital readout comprises an LCD display.

14. A postal type scale in accordance with claim 13 wherein said LCD display comprises a plurality of horizontal LCD indicators.

15. A postal type scale in accordance with claim 13 wherein in said rest position of said weight display means said weight display longitudinally extends beyond said platform edge a sufficient amount for enabling said horizontal weight display to be readable from above when said supported package size does not exceed said platform size.

16. A postal type scale in accordance with claim 9 wherein said horizontal weight display comprises a digital readout.

17. A postal type scale in accordance with claim 16 wherein said horizontal weight display comprises display indicia having a predetermined longitudinal extent, said predetermined amount of longitudinal extension for said weight display in said rest position substantially comprising said longitudinal extent of said display indicia.

18. A postal type scale in accordance with claim 17 wherein said digital readout comprises an LCD display.

19. A postal type scale in accordance with claim 18 wherein said LCD display comprises a plurality of horizontal LCD indicators.

20. A postal type scale in accordance with claim 1 wherein said movable weight display means is supported on said mounting surface and slidably movable there along within said predetermined longitudinal range for minimizing potential of damage to said weight display from dropped packages.

21. A postal type scale in accordance with claim 20 wherein said scale is an electronic scale.

22. A postal type scale in accordance with claim 21 wherein said horizontal weight display comprises a digital readout.

23. A postal type scale in accordance with claim 1 wherein said weight display means is variably extendable beyond said platform edge for enabling said weight display to be longitudinally moved along said horizontal mounting surface to a variable position beyond the edge of said supported package being weighed.

24. A postal type scale in accordance with claim 1 wherein said movable weight display means comprises a display mounting member for removably mounting said horizontal weight display thereon; whereby said horizontal weight display may be removed from said mounting member for providing said weight display at a position remote from said mounting member.

25. A postal type scale in accordance with claim 24 wherein said display mounting member comprises a slide drawer.

26. A postal type scale in accordance with claim 24 wherein said scale is an electronic scale.

27. A postal type scale in accordance with claim 26 wherein said horizontal weight display comprises a digital readout.

28. A postal type scale in accordance with claim 27 wherein said digital readout comprises an LCD display.

* * * * *